Figure 1:
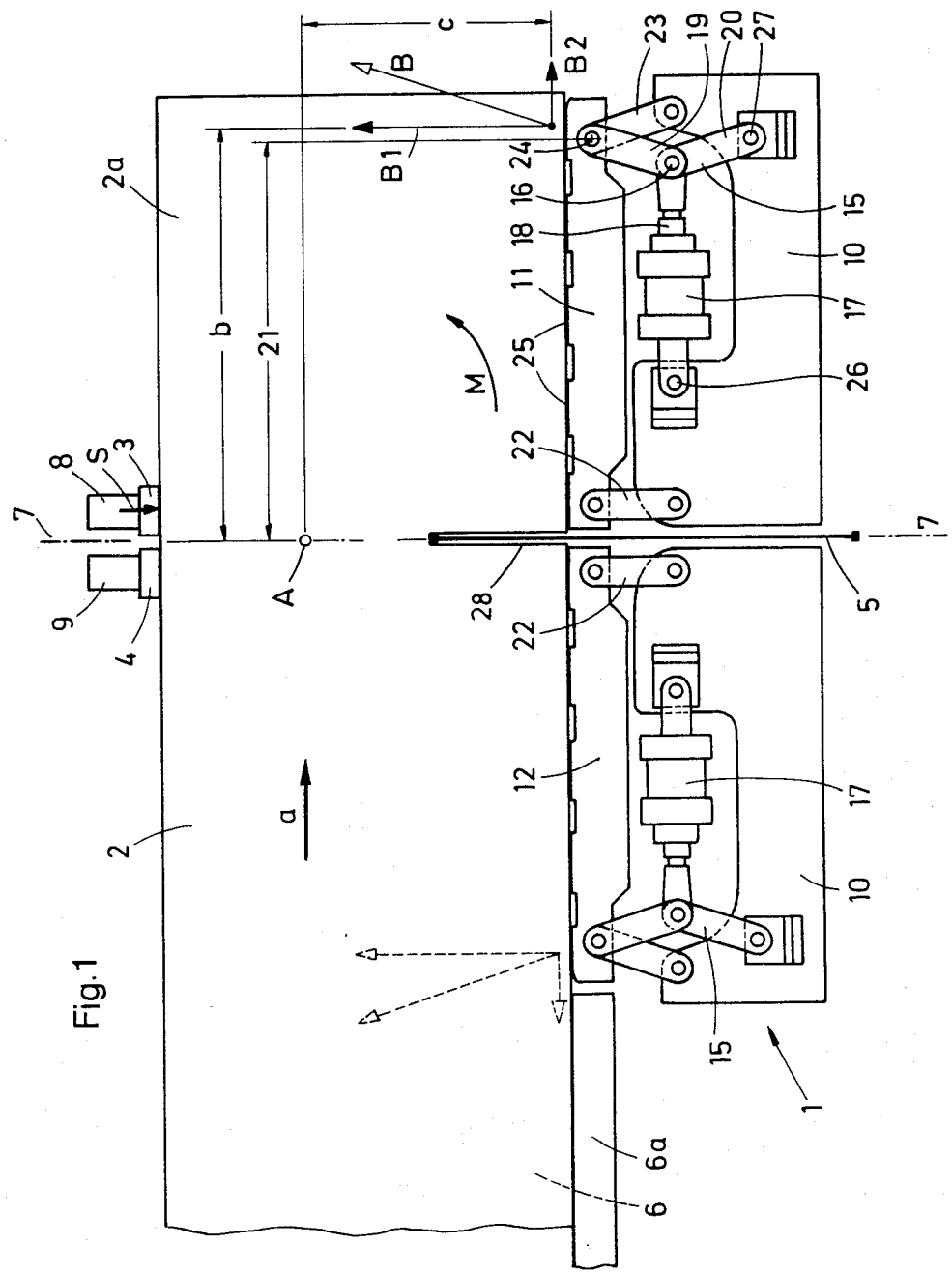

United States Patent [19]

Stahl et al.

[11] Patent Number: 4,553,460

[45] Date of Patent: Nov. 19, 1985

[54] WORK-HOLDING FIXTURE FOR METAL POWER SAWS

[76] Inventors: Werner Stahl, Aug der Hube 35; Axel Barten, Siegener Strasse 227, both of 5910 Kreuztal 5, Fed. Rep. of Germany

[21] Appl. No.: 540,689

[22] Filed: Oct. 11, 1983

[30] Foreign Application Priority Data

Oct. 20, 1982 [DE] Fed. Rep. of Germany ....... 3238809

[51] Int. Cl.[4] ............................................. B26D 47/06
[52] U.S. Cl. ....................................... 83/113; 83/107; 83/175; 269/33; 269/228
[58] Field of Search ............ 83/113, 175, 107, 411 R; 269/318, 32, 33, 25, 228

[56] References Cited

U.S. PATENT DOCUMENTS

| | | | |
|---|---|---|---|
| 1,796,763 | 3/1931 | Patterson | 269/32 |
| 2,165,614 | 7/1939 | Cook et al. | 269/32 X |
| 3,212,185 | 10/1965 | Keiter | 83/411 R X |
| 3,232,159 | 2/1966 | Stanley | 83/175 |
| 3,362,703 | 1/1968 | Blatt | 269/32 X |
| 3,709,075 | 1/1973 | Goellner | 83/113 X |
| 3,727,500 | 4/1973 | Breetvelt | 269/32 X |
| 3,991,990 | 11/1976 | Shemtov | 269/25 |
| 4,143,567 | 3/1979 | Kaiser | 83/113 |
| 4,347,754 | 9/1982 | Wehler | 269/32 X |
| 4,378,715 | 4/1983 | Kaiser et al. | 83/113 |

FOREIGN PATENT DOCUMENTS 1427247 2/1969 Fed. Rep. of Germany .

*Primary Examiner*—James G. Smith
*Assistant Examiner*—Steven P. Schad
*Attorney, Agent, or Firm*—Young & Thompson

[57] ABSTRACT

The work-holding fixture (1) for metal power saws is characterized by two gripping jaws (3, 4) arranged on the side of the work rest (6) facing away from the saw blade (5) bilaterally of the cutting plane (7—7), these gripping jaws being adjustable perpendicularly to the feeding direction (a) of the workpiece (2) by an arrangement of hydraulic clamping cylinders (8, 9), and also characterized by two work-gripping supports (11, 12) movably arranged on the machine frame (10) on the side of the work rest (6) facing the saw blade (5) bilaterally of the saw blade (5), with a toggle lever control (13, 14) for producing an opening moment (M) acting on the cutting gap (28) in the workpiece (2).

8 Claims, 3 Drawing Figures

WORK-HOLDING FIXTURE FOR METAL POWER SAWS

The invention relates to a work-holding fixture for metal-sawing machines with gripping jaws arranged along the longitudinal sides of a feeding device and/or alongside the work rest.

Internal stresses are released when sawing workpieces of metal with the result that the cutting gap narrows, starting with a certain depth, so that the saw blade jams, thus causing damage to the drive and guide elements and the saw blade proper.

Numerous clamping devices for metal power saws have been proposed which, besides providing a secure hold of the workpiece, are to prevent constriction of the cutting gap to preclude seizing of the saw blade during the sawing operation. In a work-holding device known from German Pat. No. 2,641,255, narrowing of the cutting gap during sawing is avoided by producing, by means of the gripping jaws, a torque at the workpiece in addition to the normal clamping action, this torque counteracting the internal forces constricting the gap. This torque, acting in the opening sense on the cutting gap in the workpiece, is produced by clamping cylinders effective on two movable gripping jaws arranged on both sides of the saw blade. Each gripping jaw consists of a lower part acted upon by the associated clamping cylinder, and an upper part exhibiting a point or blade on its surface facing the workpiece and being urged by the clamping cylinder against a fixed gripping jaw located on the opposite side of the workpiece. The upper parts of the two gripping jaws are displaceable against the bias of a restoring spring in guide elements of the lower parts, the guide elements extending at an angle of 45° to 75° to the adjusting device of the movable gripping jaws and being in mirror-image symmetry to each other. Upon operation of the clamping cylinders, opening forces at right angles to the cutting plane are transmitted to the workpiece by way of the blades of the upper gripping jaw parts penetrating into the workpiece, besides the clamping forces in parallel to the cutting plane; these opening forces, in cooperation with the clamping forces, effect the rotational and bending moments, respectively, which keep the cutting gap open during the sawing operation.

The grave disadvantages in this known work-holding device reside in that the power of the clamping cylinders must be very great to effect, on the one hand, the required gripping forces and, on the other hand, the torques acting along opening lines on the cutting gap in the workpiece, and in that only an unstable clamping of the workpiece is attained.

In contrast thereto, the invention is based on the object of developing a work-holding device for metal power saws which, with the application of relatively small gripping forces, makes it possible to clamp the workpiece securely in place and avoids a constriction of the saw cutting gap.

The toggle lever actuation and the eccentric clamping lever operation of the work-holding support in contact with the workpiece portion to be sawed off permit secure holding of the workpiece and avoid constriction of the cutting gap with clamping forces that are considerably reduced as compared with the conventional work-holding fixtures. The novel work-holding fixtures make it possible to cut off small fragments with the same ease as the exact cutting through at the cutting end.

Figure 2:
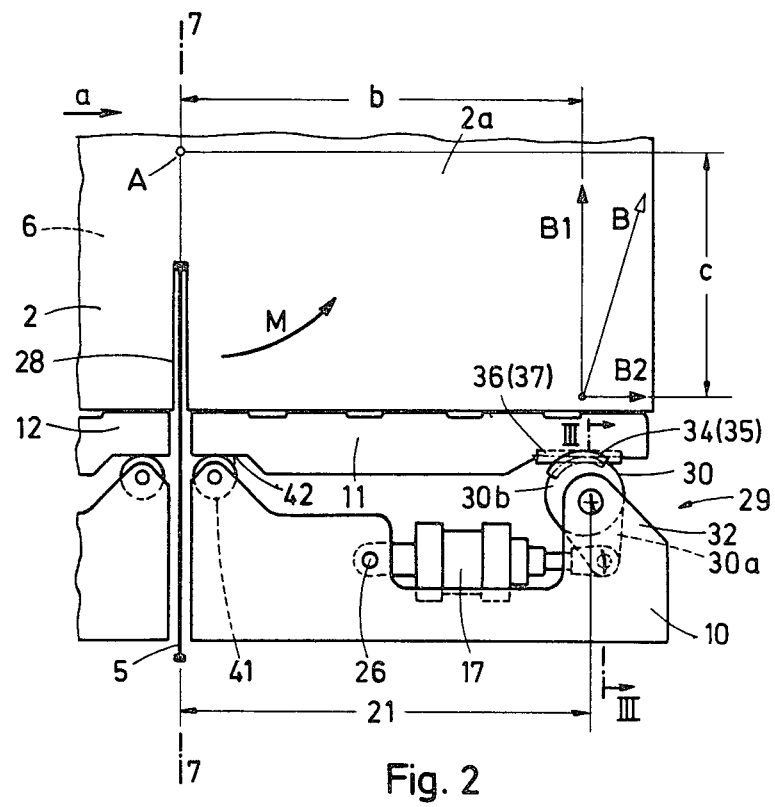
Figure 3:
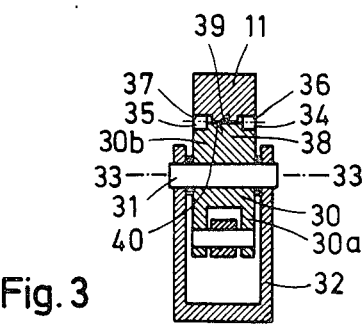

The invention will be described in detail below with reference to the two embodiments illustrated schematically in the drawings wherein:

FIG. 1 shows the first embodiment of the work-holding fixture of this invention in a horizontal projection, FIG. 2 shows a fragmentary top view of the second embodiment, and FIG. 3 shows a section along line III—III in FIG. 2 on an enlarged scale.

In the two embodiments described herein, identical or similar components bear the same reference numerals.

The work-holding fixture 1 for a circular power saw to saw apart metallic workpieces 2 comprises as its main parts two gripping jaws 3, 4 arranged bilaterally of the cutting plane 7—7 on the longitudinal side of a roller track 6 for workpiece feeding, facing away from the saw blade 5, these gripping jaws being adjustable by means of hydraulic clamping cylinders 8, 9 perpendicularly to the feeding direction a of the workpiece 2, and also work-holding supports 11, 12 with a toggle lever control, these supports being movably arranged on both sides of the cutting plane 7—7 on the machine frame 10 on the side of the roller track 6 facing the saw blade 5.

The toggle lever 15 to apply force to the work-gripping supports 11, 12 is attached with its toggle joint 16 to the piston rod 18 of a hydraulic clamping cylinder 17, the effective direction of the latter extending perpendicularly to the cutting plane 7—7; this clamping cylinder is articulated to the machine frame 10. The two one-armed levers 19, 20 of the toggle lever 15 are articulated with their ends facing away from the toggle joint 16 to the machine frame 10 and to the work-gripping support 11 at a spacing 21 from the cutting plane 7—7. The work-gripping support 11 is supported on the machine frame 10 by a movable abutment in the form of a supporting fishplate 22 in the zone of the effective direction of the clamping force S of the clamping cylinder 8 of gripping jaw 3; the fishplate 22 is hingedly joined to the work-gripping support 11 and the machine frame 10. A guide arm 23 articulated to the machine frame 10 engages at the connecting joint 24 of toggle lever 15 and work-gripping support 11.

The clamping surface of the supports 11, 12, in alignment with the back 6a of the roller track, is subdivided into web faces 25 to obtain a maximally large specific surface pressure between the work-gripping support 11 and the workpiece 2 and a correspondingly high contact friction. When sawing apart workpieces made of relatively soft metallic materials, the clamping surface of the supports 11, 12 is suitably fashioned to be continuous to avoid damage to the workpiece.

In order to saw off a piece 2a from the block 2, the latter is clamped in place between the gripping jaws 3, 4 and the work-gripping supports 11, 12 by operating the clamping cylinders 8, 9. After making the initial saw cut, the clamping cylinder 17 of the toggle lever control is placed in operation, the pressure force of this cylinder being enhanced by the toggle lever 15. The clamping force B, transmitted to the part 2a of the block 2 to be a sawed off by way of the lever 19 of the toggle lever 15 and the work-gripping support 11, is divided into the force component B1 acting in parallel to the cutting plane 7—7, as well as into the force component B2 extending perpendicularly to the cutting plane 7—7. By the clamping force component B1, with respect to the reference point A lying in the cutting plane 7—7, a torque B1×b is produced, and by the clamping force component B2 a torque B2×c is produced, acting on the block part 2a to be sawed off and adding up to an opening moment M, which holds open the cutting gap 28 while the block 2 is being sawed through and is absorbed by the work-gripping support 12 as well as, in some cases, the back 6a of the roller track. At the same time, the work-gripping support 11 pulls the block part 2a to be sawed off away from the saw blade 5 with the opening force B2. The toggle lever 15 with the guide arm 23 and the supporting fishplate 22 moving in the top dead center zone effect a controlled, small movement of the work-gripping support 11 perpendicularly to the cutting plane 7—7 and in the direction toward the block part 2a to be cut off. While the block 2 is being sawed through, the reference point A assumed to be lying in the cutting plane 7—7 moves in a direction toward the gripping jaws 3, 4.

The work-holding fixture makes it possible for the workpiece to exhibit a stable clamped condition, since the sawing gap can be kept open with only a single work-gripping support in contact with the part of the workpiece to be sawed off. Depending upon whether the beginning or the end of the workpiece is to be cut off, the work-gripping support 11 or the work-gripping support 12 is operated.

If both work-gripping supports 11, 12 are to come into contact with the workpiece 2 by means of the toggle lever control means, this can be done by measuring the displacement path of the work-gripping supports or by means of a mechanical and/or hydraulic synchronous control of the work-gripping supports in order to obtain a stable clamped condition of the workpiece.

The opening forces B1 and B2 can be varied, and thereby the opening moment M acting on the cutting gap 28 can be adjusted, by an adjustment of the connecting joint 26 between the clamping cylinder 17 for the toggle lever 15 and the machine frame 10 at right angles to the cutting plane 7—7, as well as by an adjustment of the connecting joint 27 between the toggle lever 15 and the machine frame 10 in parallel to the cutting plane 7—7. Adjustment of the connecting joints 26, 27 can be effected, for example, by spacer elements.

In a modification of the embodiment as described, it is possible to arrange respectively two toggle levers 15 for actuating the work-gripping supports 11, 12 in a series. Furthermore there is the possibility of replacing the clamping cylinders 17 of the toggle lever control devices by a spring means which can comprise a mechanical, hydraulic, or pneumatic spring, so that the opening forces B1 and B2 are produced as reactive forces to the clamping forces S of the gripping jaws 3, 4.

In the work-holding fixture 29 according to FIGS. 2 and 3, an eccentric clamping lever 30 is utilized for operating the work-gripping supports 11, 12; this lever is pivotably supported by means of a pin 31, in a bearing block 32 mounted on the machine frame, at a distance 21 from the cutting plane 7—7. A clamping cylinder 17 articulated to the machine frame 10 engages an arm 30a of the clamping lever 30. The other clamping lever arm 30b has two toothed ring segments 34, 35 arranged eccentrically to the swivel axis 33—33 of the lever 30, these toothed ring segments being located in congruence at a spacing at the end of the lever arm 30b and meshing with two racks 36, 37 attached at the outer end of the work-gripping support 11. An annular segment 38 with a curved clamping surface 39 is formed between the two toothed ring segments 34, 35; this clamping surface cooperates with a planar counter surface 40 between the racks 36, 37 on the work-gripping support 11. The radius of the curved clamping surface 39 of the eccentric lever 30 corresponds to the pitch radius of the toothed ring segments 34, 35.

The work-gripping supports 11, 12 are supported with their ends facing the cutting plane 7—7 against the machine frame 10 by way of a movable abutment constituted by a rotatable rollers 41 mounted on the machine frame 10 and by contact surfaces 42 on the work-gripping supports 11 and 12.

Force is exerted on the eccentric clamping lever 30 by operation of the clamping cylinder 17 of the work-holding fixture 29 in such a way that a clamping force component B1 in parallel to the cutting plane 7—7 is exerted by way of the clamping surface 39 of the lever 30 and the counter surface 40 on the work-gripping support 11 or 12, and a force component B2 at right angles to the cutting plane 7—7 is exerted by way of the toothed rack drive means 34, 35, 36, 37 on the block part 2a to be sawed off, and the force components B1, B2 exert an opening moment M on the cutting gap 28 while the block 2 is being sawed through.

We claim:

1. Work-holding fixture for a metal power saw (5) that cuts through a metal workpiece (2) along a cutting plane (7—7), comprising two gripping jaws (3,4) disposed on opposite sides of and closely adjacent the cutting plane, means (8,9) for selectively separately urging each of said gripping jaws toward the workpiece in a direction opposite the direction in which the saw cuts through the workpiece, and on the other side of the workpiece two work-holding supports (11,12) on opposite sides of said cutting plane and elongated in a direction perpendicular to the cutting plane, a toggle lever (15) for selectively individually swinging the end of each of said supports remote from the cutting plane toward the workpiece, a hydraulic clamping cylinder (17) for actuating said toggle lever (15), said cylinder extending perpendicular to said cutting plane (7—7), said toggle lever (15) comprising two arms (19, 20) that are pivotably interconnected at a joint (16) secured to a piston rod (18) of said clamping cylinder (17), one end of one said arm (20) being pivotably connected to a machine frame (10) that supports said work-holding fixture, one end of the other said arm (19) being pivotably connected to the associated work-holding support (11, 12), and means (22) movably interconnecting the end of said elongated work-holding support (11, 12) adjacent said cutting plane to said machine frame (10) at a point substantially in line with the direction in which the associated said gripping jaw (3, 4) acts on the workpiece.

2. Work-holding fixture as claimed in claim 1, and a guide arm (23) engaging at the connecting joint (24) of the toggle lever (15) and the work-holding support (11) and being articulated to the machine frame (10).

3. Working-holding fixture according to claim 1, in which said movably interconnecting means (22) is a supporting fishplate articulated to the work-holding support (11) and to the machine frame (10).

4. Work-holding fixture as claimed in claim 1, in which each said support (11, 12) has a plurality of work engaging faces (25) spaced apart along its length.

5. Work-holding fixture as claimed in claim 1, and means mounting the ends of said elongated work-holding supports (11, 12) which are adjacent said cutting plane (7—7) for movement toward and away from said cutting plane, said swinging means when actuated moving both ends of said elongated support away from said plane.

6. Work-holding fixture for a metal power saw (5) that cuts through a metal workpiece (2) along a cutting plane (7—7), comprising two gripping jaws (3,4) disposed on opposite sides of and closely adjacent the cutting plane, means (8,9) for selectively separately urging each of said gripping jaws toward the workpiece in a direction opposite the direction in which the saw cuts through the workpiece, and on the other side of the workpiece two work-holding supports (11,12) on opposite sides of said cutting plane and elongated in a direction perpendicular to the cutting plane, an eccentric clamping lever (30) for selectively individually swinging the end of each of said supports remote from the cutting plane toward the workpiece, said swinging means further comprising a clamping cylinder (17) pivoted to a machine frame (10) on which said work-holding fixture is mounted, said clamping cylinder having a piston rod pivotably connected to a lever arm (30a) of said clamping lever (30), said clamping lever being pivotably mounted on said machine frame (10), said clamping lever having another clamping lever arm (30b) having two toothed ring segments (34, 35) disposed eccentrically to the axis (33—33) of swinging movement of the lever (30), said segments (34, 35) being congruent with each other and spaced apart and meshing with two racks (36, 37) secured to the outer end of the associated said work-holding support (11, 12), and an annular segment (38) with a curved clamping surface (39) disposed between the two toothed ring segments (34, 35) and coacting with a planar counter surface (40) between said racks (36, 37) on the work-holding support (11).

7. Work-holding fixture as claimed in claim 6, in which the radius of said curved clamping surface (39) of said eccentric lever (30) is the same as the pitch radius of the toothed ring segments (34, 35).

8. Work-holding fixture as claimed in claim 6, and means mounting the ends of said elongated work-holding supports (11, 12) which are adjacent said cutting plane (7—7) for movement toward and away from said cutting plane, said swinging means when actuated moving both ends of said elongated support away from said plane.

* * * * *